United States Patent [19]

Viertel et al.

[11] 4,363,511
[45] Dec. 14, 1982

[54] BEARING FOR A SUN VISOR FOR A VEHICLE HAVING A MIRROR ILLUMINATED BY AN ELECTRIC SOURCE OF LIGHT

[75] Inventors: Lothar Viertel, Saarlouis; Klaus-Peter Kaiser, Wermelskirchen; Manfred Nowak, Solingen, all of Fed. Rep. of Germany

[73] Assignee: Gebr. Happich GmbH, Fed. Rep. of Germany

[21] Appl. No.: 166,804

[22] Filed: Jul. 9, 1980

[30] Foreign Application Priority Data

Aug. 9, 1979 [DE] Fed. Rep. of Germany ....... 2932302

[51] Int. Cl.³ ............................................. B60J 3/02
[52] U.S. Cl. ................................. 296/97 K; 200/61.7; 296/97 H; 362/137
[58] Field of Search ................. 296/97 H, 97 B, 97 R, 296/97 K; 200/61.7; 362/144, 272, 287, 137, 155

[56] References Cited

U.S. PATENT DOCUMENTS 2,431,491 11/1947 Lee et al. ............................. 362/137
3,838,234 9/1974 Peterson ............................. 200/61.7
4,174,864 11/1979 Viertel et al. .................... 296/97 H

FOREIGN PATENT DOCUMENTS 2730926 1/1979 Fed. Rep. of Germany ... 296/97 H
7908453 10/1980 France .............................. 296/97 H Primary Examiner—Robert R. Song
Assistant Examiner—Donn McGiehan
Attorney, Agent, or Firm—Ostrolenk, Faber, Gerb & Soffen

[57] ABSTRACT

The invention is concerned with a hollow mounting pin for a sun visor for an automotive vehicle. The mounting pin is bent. One leg is affixed to the body of the automotive vehicle. The other leg serves as one part of the swivel bearing for the sun visor body. An electric conductor passes through the hollow mounting pin. At the end of the hollow mounting pin located at the swivel bearing on the visor body, a receptacle is formed. An electric switch contact is supported in the receptacle. The contact includes a contact projection that extends through the wall of the receptacle. A cooperating strap is defined on the visor body. As the visor body is swiveled, the strap selectively contacts or is out of contact with the contact projection. The electric switch contact in the receptacle is prevented from pivoting with respect to the receptacle by the contact projection and/or by appropriate complementary profiling of the electric switch contact and the receptacle. Various configurations for the electric switch contact are disclosed, including a U-shaped body with the contact projection being at the web of the "U", a length of wire, bent generally hairpin-like, and having a U-shape, with the contact projection being on the one arm of the "U". The electric switch contact is adapted to have the conductor that passes through the hollow mounting pin secured to it and through the contact strap on the visor body, the electric connection to the light source is made.

20 Claims, 11 Drawing Figures

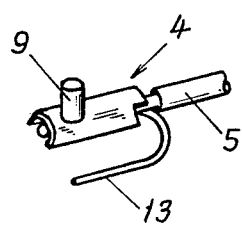
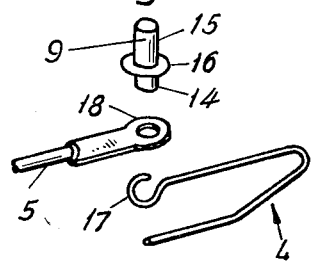
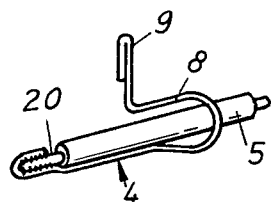
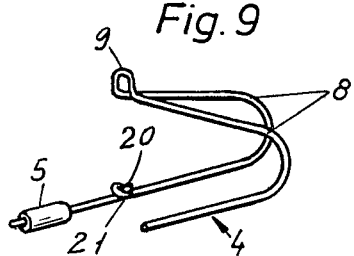
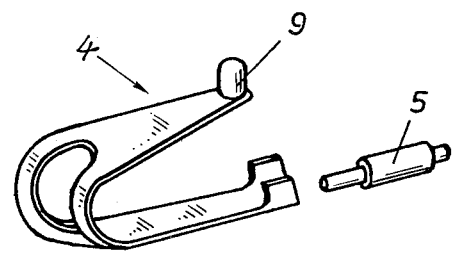

BEARING FOR A SUN VISOR FOR A VEHICLE HAVING A MIRROR ILLUMINATED BY AN ELECTRIC SOURCE OF LIGHT

BACKGROUND OF THE INVENTION

The present invention relates to a swivel bearing for a sun visor for an automotive vehicle and it is useful for a sun visor having a mirror illuminated by an electric light source. The electric conductor and a part of the electric contact for connecting and disconnecting the source of light are associated with the mounting pin of the swivel bearing. The on-off switch positions for the light source are obtained through the relative movement between the mounting pin and the sun visor body upon swiveling displacement of the sun visor. See, for example, U.S. Pat. No. 4,174,864.

It is already known to use the pin of the swivel bearing for guiding the electric line or else to use it merely as one current conducting wire for the source of light in the case of illuminated sun visor mirrors. For double conduction (plus and minus), two wires are passed through the swivel pin, which is then developed hollow to receive the wires.

In another embodiment, the mounting pin is developed from an electrically conductive material. The opposite pole is developed as a wire with another conductor protected by an insulating jacket. It is furthermore known to conduct only a single current conductor through the mounting pin itself, which may then be a metallic pin, and to provide the second current lead in some other manner, for instance, through the opposite mount of the sun visor.

Each of these structural variants, however, has disadvantages. On the one hand, they present manufacturing problems. On the other hand, they impair continuous operation and safety. It is disadvantageous to use a metallic pin, particularly since the swivel mounting pin of a sun visor body always consists of two arms which meet at an angle to each other and thus there is a sharp bend in the electric conductor. Particularly if the mounting pin is manufactured from pipe lengths, serious disadvantages are present, as will be indicated further below.

A metallic mounting pin has the disadvantage that it is necessary to start from a blank which must have first been manufactured, and several steps are then required to bring the pin into its final shape. Deburring of the cut surfaces is required. Otherwise, the sharp, pointed edges result in injury to the bearing upon turning or swinging of the sun visor body. Furthermore, when an insulated electric line is introduced or passed through the mounting pin, its insulation is rapidly damaged. Similarly, a large amount of time is required if lines are to be inserted through the mounting pin upon assembly, particularly if the bend angle of the pin is close to 90°, as is true of most swivel bearings.

The metallic mounting pin forms, in each embodiment, a part of the switch contact. This reduces the number of structural parts. It must be further machined for this purpose. Either the mounting pin must be provided with a separate contact element and therefore must have a two-region development, namely on the one hand a contact place and on the other hand an insulating place, or else the pin must be transformed from its circular development by cut-outs or flattenings so as to form protruding contact surfaces. These embodiments show that a metallic mounting pin by itself, particularly one produced from pipe lengths, is unfavorable from a manufacturing standpoint and is also susceptible to trouble in operation.

The disadvantages which result from such a metallic mounting pin, however, also concern the mating contact. In all cases, a contact spring is required, which provides positive contact and also selfcleans the contact surfaces. The contact spring must now be associated with other parts, namely parts of the stabilizing insert of the sun visor body. Therefore, sun visor insert must be equipped not only, as previously, with a simple mount to receive the mounting pin, but it must also have a development which reliably holds the contact spring. In the present prior art, the stabilizing insert in the sunvisor body is comprised of plastic so that the spring, after formation and mounting, must also be equipped for connection with an electric line.

SUMMARY OF THE INVENTION

The object of the invention is to provide a bearing for a sun visor for vehicles, wherein the sun visor has a mirror illuminated by an electric light source, and there is an electric feed line for the light source, which bearing is simple to manufacture and highly reliable to use.

According to the invention, the mounting pin of the swivel bearing is hollow and is comprised of non-conductive material. It conducts at least one wire of the current conduit in an insulated manner. It serves for the development of the pin end received in the body of the sun visor as a holder for a part of the electric switch contact.

The invention includes a mounting pin which is not necessarily produced in its final shape in a single operation. For instance, it may be an injection molding which is subsequently bent or otherwise deformed, for instance, by machining. Thus, an inexpensive structural body is produced, which is always of the same shape and can be combined without any difficulty with other structural parts. Furthermore, such a mounting pin can be made as an insulating body through which a bare wire may be conducted without any disadvantage, or in which damaged insulation on a wire does not result in any disturbance. An advantage of a mounting pin which is developed as an injection molding is that the holder for the electric switch contact can be developed without any additional work. The mounting pin received in the body of the sun visor is merely developed so as to correspond to the shape of the part of the electric switch contact which is to be received.

In this connection, the holder formed in the mounting pin for receiving the one part of the electric switch contact to include a prismatic or oval shaped or otherwise shaped receptacle, which is complementary to the cross-section of the contact part to be received. The holder may alternatively be a cylindrical free-space with an anti-twist means, such as a longitudinal groove head-shaped recess into which a locking development for the non-twisting fastening of the contact part extends. To this end, the anti-twist means of the switch contact part, which is received by the holder of the mounting pin, can be a contact projection which pases through the wall of the holder.

For easy installation of the electric wire or wires, the hollow of the swivel pins completely passes through each arm of the L-shaped pin and has an access opening in the region of the bend. Where the two hollows of the arms of the mounting pin meet at an angle, there is a free space, which is enlarged, as compared with the ends of the hollows and which passes into the hollows eases introduction of the electric wire. Thus, it is possible to pass the electric wave from the end of one arm of the pin, up into the free space and to then conduct that end of the wire from the free space to the other arm of the mounting pin. However, it is also possible to conduct both ends of the wire from the free space to the mounting pin arm ends.

In order to form the largest possible spring path for the contact element and to counteract deterioration of its spring properties, one preferred embodiment of the electric switch contact part to be contained in the holder of the mounting pin is formed of a U-shaped metallic spring having a contact projection which is arranged in the region of the free end of one arm of the U-shaped spring.

The switch contact may be in one of many different forms. For instance, it may be in the form of a metallic stamping wherein the contact projection is made of a second material different from the material of the switch contact and the contact projection is connected with one arm of the metal stamping. It is also possible, particularly if the stamping of the switch contact is formed of a material which is suitable for switch projections, for the switch projection to be of one piece with and be of the same material as the stamping.

Another embodiment of the electric switch contact part can be comprise of a strand-like material, such as resilient wire. The contact part includes clamping arms which are arranged in a crimping manner with respect to each other. One end of the clamping arms is provided with closable clamping means which receive the contact part of the electric wire. Switch contact parts comprised of wire can be produced in a particularly simple manner without waste of material, particularly because they are repeatedly bendable in different directions without weakening of the material. Furthermore, selection of the contact part material is easier because in the case of wire, it is not necessary to pay attention to a specific deep-drawn quality or to tear strength. Further still, no sharp stamping edges are present, eliminating concern about adjoining softer materials which might be easily damaged. Moreover, there are advantages upon connection of the switch contact part, which is formed of wire, with the electric conductor. A clamping connection can be effected in a more reliable and stronger manner that in the case of a stamped part. There is an advantage in the case of a solder connection between the switch contact part and the electric conductor, since two materials of approximately the same volume are being joined and they therefore also receive in approximately similar manner the required soldering heat. There are also advantages with respect to the switch projection. In the case of a single-piece development of the contact part and the switch projection, the latter can be shaped in simple fashion. If the switch part projection is comprised of a second material, the connection with the electrical conductor can be effected in a similar manner, as described above.

An additional embodiment which has the above-indicated advantages comprises an integral eye or loop of the same material which is associated with the switch contact part that is formed of wire. The loop serves to receive, by clamping or soldering, one end of the electric conductor. In another embodiment, the switch contact part is formed of wire, but it has a support comprised of a second material. Here, the support for the switch projection has a receiver for the free end of the electric wire, which serves for the clamping or soldering connection with the wire.

BRIEF DESCRIPTION OF THE DRAWINGS

Several illustrative embodiments of the invention are described below with reference to the drawings in which:

FIG. 5 shows another embodiment of a switch contact part developed as a stamping, FIGS. 6 to 9 each show a switch contact part comprised of a stranded material, such as wire.

DESCRIPTION OF THE PREFERRED EMBODIMENT

Figure 10:
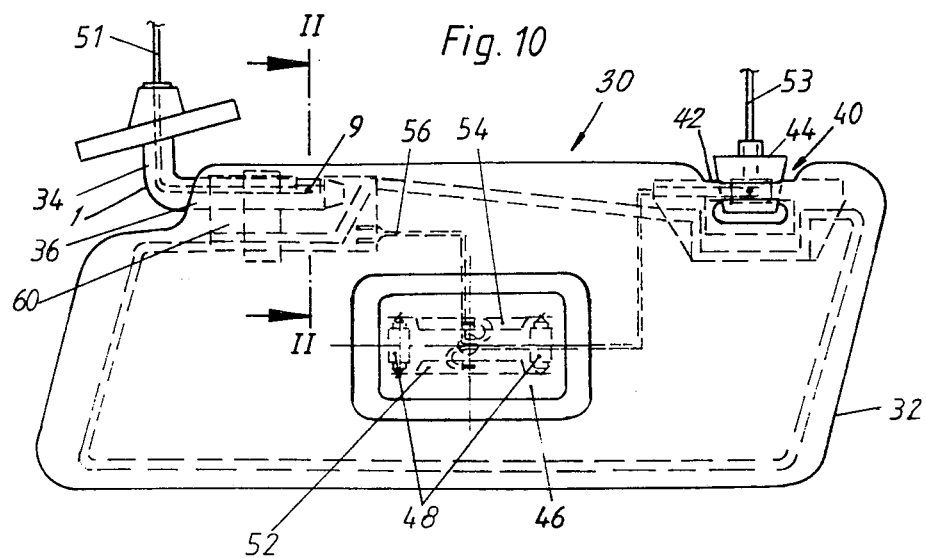
FIG. 10 is a view of a sun visor provided with a mounting pin designed according to the invention.
Figure 11:
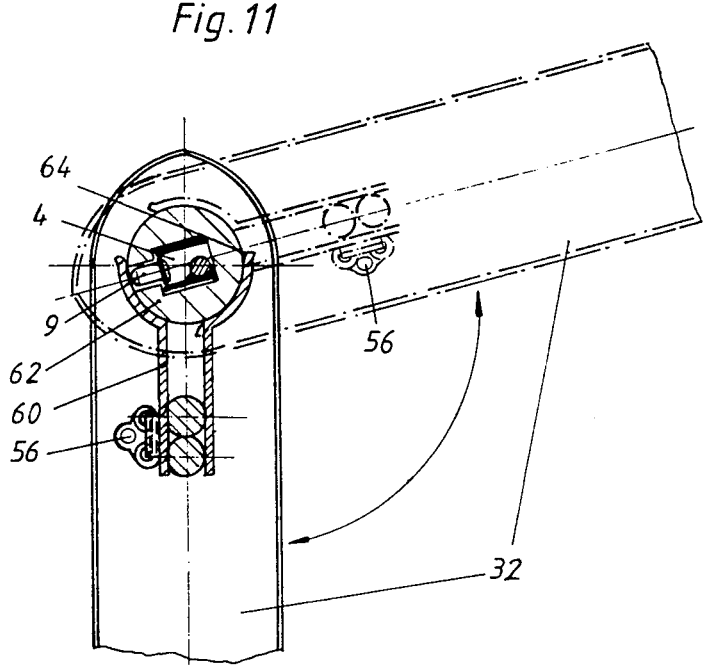
FIG. 11 is a view of the swivel bearing of the visor of FIG. 10, seen cross-sectionally along the line between arrows 11—11.

In FIGS. 10 and 11, a sun visor 30 having a mounting pin 1 according to the invention is illustrated. It is, for example the type of lighted sun visor shown in U.S. Pat. No. 4,174,864, which patent is incorporated herein by reference. The sun visor has a body 32 which is conventionally formed of and filled with a foamed plastic material. At one upper longitudinal edge of the visor body 32, at one end area, there is the bearing including the mounting pin means according to the invention. The mounting pin 1 includes an upwardly facing arm 34 which is attached to the body of the automotive vehicle. The other horizontal arm 36 of the mounting pin 1 defines the swivel for the visor body 32. The visor body 32 may be pivoted up and down between the storage and operative positions as shown in FIG. 11. Furthermore, the visor body may also be swiveled toward and away from the below described counter bearing means 40 around the vertical leg 34 of the mounting pin.

There are counter bearing means 40 comprised of the counter bearing shaft 42 which is attached to the visor body and the counter bearing housing 44 which is attached on the vehicle body. The counter bearing means 40 are disposed in the other end area of the upper longitudinal edge of the visor body 1 from the main bearing 1. For further details concerning the counter bearing means, see the aforesaid U.S. Pat. No. 4,174,864.

A mirror 46 with an associated electrically operated lamp 48 is disposed on the side of the sun visor body 42 that faces the passenger compartment of the vehicle when the sun visor is flipped into its down position around the bearing pin arm 36. The electric light source can be shut off or turned on by the below described electric contact means.

The electric light source 48 is connected through one electric lead 52 thereof to the counter bearing shaft 42 and through the counter bearing housing 44 and the lead 53 to one electric pole. The light source 48 is connected to the other lead 54 and to the lead 56 that leads to the below described swivel bearing mounting pin strap 60. The mounting pin strap 60 is a metal plate buried inside the visor body and to which the lead 56 is connected. The strap has a curved mounting pin engaging surface 62 which is selectively out of engagement with the below described contact projection 9 when the visor body is upraised in the inoperative position (solid line in FIG. 11). As the visor body is rotated to the downward position, the widened curved section 64 of the surface 62 meets the contact projection 9 and continued swiveling of the visor body 32 moves the surface 62 into engagement with the contact projection 9. Since the surface 62 is closer to the surface of the below described receptacle 3, the surface 62 applies pressure to the contact projection 9, assuring good electric contact. In this way, the mounting pin means cooperates in selectively connecting the electric light source to the power supply when the visor body is down and the mirror is facing into the passenger compartment of the vehicle and the light source is automatically turned off as the visor body is flipped up to the inoperative position.

Figure 1:
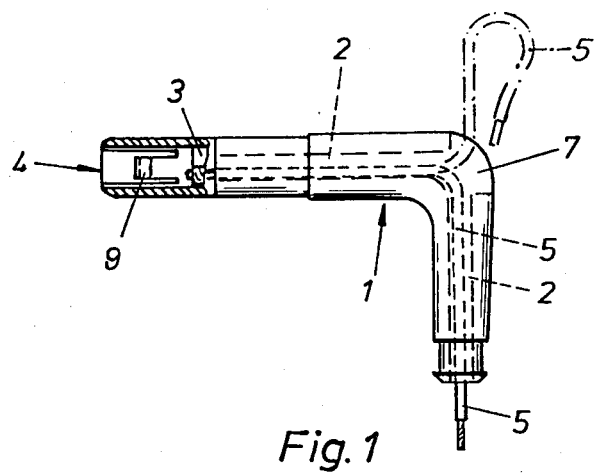
FIG. 1 shows a mounting pin for a swivel bearing of a sun visor body that is provided with electrical equipment.

Referring to FIG. 1, there is a mounting pin 1 for being located at the end of a sun visor body. (See FIG. 10) The mounting pin 1 is L-shaped. The individual arms of the mounting pin 1 have hollows 2 through them to receive electrical parts, described below. While the hollow in the vertical visor body support and fastening arm has a substantially constant cross-section throughout its length, the hollow of the horizontal mounting pin arm terminates in a holder 3 the chamber-like development which is intended to receive the sunvisor body. The shape of the holder 3 is complementary to the shape of a contact part 4 for an electrical switch contact, whereby the contact part 4 is reliably received by the holder 3 without additional measures. To secure the contact part 4 in the holder 3, an electric conductor 5 extending through the hollows 2 of the pin 1 is connected in non-detachable, electrically conductive manner with the contact part 4. When the electric conductor 5 is fixed so that it cannot slide in the hollows, the holder 3 also holds the contact part 4 in permanent fashion. The contact part 4 can alternatively be retained in the holder 3 in some other manner, both radially and axially, by a switch contact projection 9 that passes through the wall of the holder 3 and the contact projection 9 both forms the contact and also secures it against displacement.

The two hollows 2 meet in the region of the bend of the mounting pin 1, in a larger volume of free space 7, which, as shown in dashed line, eases the introduction of the electrical conductor 5 into the hollows.

The free end of the conductor 5 is introduced into the holder starting from the support 3, until the attached contact part 4 is completely received by the horizontal arm of the holder 3. Then, the free end of the electric conductor is passed from the free space 7 through the other arm of the mounting pin 1.

Figure 2:
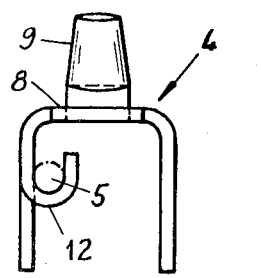
FIGS. 2, 3 and 4 are respectively an end, side and plan view of a switch contact part developed as a stamping.
Figure 3:
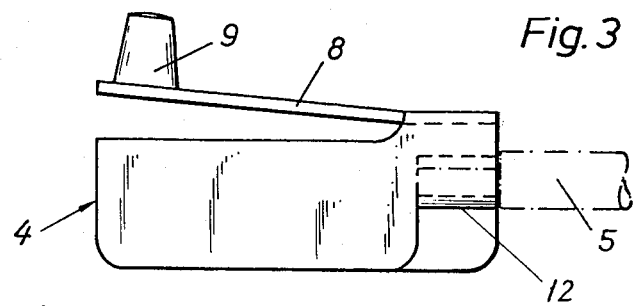
Figure 4:
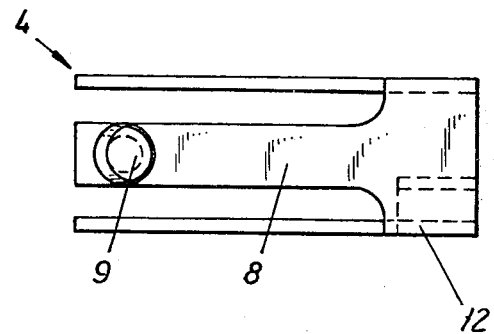

A first embodiment of an electric contact part 4 is shown in FIGS. 2 to 4. This part can be formed by a stamping. The contact part has a substantially U-shaped cross-section. The web joining the legs of the "U" extends partially longitudinally along the "U" and then narrows and is away from the legs of the "U" for forming a contact spring 8. Near its free end, the contact spring 8 carries an outwardly projecting contact projection 9. The contact projection 9 is comprised of a second material. It is connected with the contact spring 8, by soldering, welding, crimping or riveting. The electrical conductor 5 may be connected with the contact part 4 in any of the above noted ways. There is a receiver 12 for the free uninsulated end of the insulated electrical conductor 5. The receiver 12 is formed of a tongue which is cut and shaped to define a clamp for the conductor.

Another embodiment of an electric contact part which is also made from a stamping, is shown in FIG. 5. This is a substantially U-shaped, resilient metal strap, which includes a contact projection 9 at the end region of one of its arms and a receiver for the free end of the electrical conductor 5 at the end region of the other of its arms.

A further embodiment of an electric contact part 4 comprised of a combination of a stamped part and a wire part is shown in FIG. 6. The stamped part is generally semi-cylindrical in shape. At its exterior toward one end, it supports the contact projection 9. Toward its other end, it has a clamping development, which simultaneously holds the U-shaped wire bow 13, the other wire part of the contact part 4 and the free end of the electrical conductor 5.

In the next embodiment of FIG. 7, the contact projection 9 is a separate stud which includes a lower, fastening or connecting element surface 14. The contact projection 9 includes a support collar 16 along its length. The contact part 4 includes a bent length of resilient wire. There is a lug of the contact part 4 formed substantially in U-shape at 17 at one end of the wire. The contact projection is installed in the contact part by inserting the contact surface section 15 through the lug 18 for the electrical conductor 5 and then through the U-shaped lug 17 at the end of an arm of the U-shaped wire 4. Permanent attachment may be effected by soldering or by riveting of the contact projection.

FIGS. 8 and 9 show embodiments of contact parts 4 which are formed entirely of resilient wire. The contact spring 8 of FIG. 8 is developed and bent with only two arms. The contact spring 8 of FIG. 9 is developed and folded to have four arms. The contact projections 9 are in each case formed of outwardly protruding lugs. The connection of each contact part to the electrical conductor 5 in each case comprises the free end of the electrical conductor 5 being provided with an uninsulated end 20. In the embodiment of FIG. 8, the end 20 is secured by clamping of the wire 8 around the end 20 and in the embodiment of FIG. 9, the end 20 is received in a loop 21 at the end of the wire 8. In either case, a solder connection is also preferred because of its great reliability.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

What is claimed is:

1. Mounting pin means for a sun visor for an automotive vehicle, wherein the sun visor includes an electrified light source in the body of the sun visor; the sun visor having swivel bearing means;

the swivel bearing means including a mounting pin connected to the body of the sun visor and around which the visor body is swivelable for defining the swivel bearing means there; the mounting pin being for connecting the sun visor body to the body of an automotive vehicle; the mounting pin being hollow and being comprised of electrically non-conductive material;

the swivel bearing means further including an electric conductor guided through the hollow of the mounting pin, the mounting pin including an end portion thereof at the sun visor body; an electric switch contact receptacle being defined in the mounting pin end portion;

a first electric switch contact being supported in the receptacle and being electrically connected with the conductor; the receptacle and the first switch contact are respectively so shaped that the first switch contact is prevented from swiveling in and with respect to the receptacle;

a second electric switch contact being supported on the visor body at the swivel bearing means; the second electric switch contact being electrically connected with the light source; and the first and second electric switch contacts being so shaped and positioned that at one swivel position of the visor body, the contacts engage, and at another swivel position of the visor body, the contacts disengage.

2. The mounting pin means of claim 1, wherein the receptacle comprises an opening of first cross-section and the first switch contact having a complementary cross-section.

3. The mounting pin means of claim 2, wherein th complementary cross-sections are both prismatic in shape.

4. The mounting pin means of claim 2, wherein the complementary cross-sections are both oval in shape.

5. The mounting pin means of claim 1, further comprising a contact projection from the first switch contact; the receptacle having a wall through which the contact projection projects, and the projection preventing swiveling of the first switch contact with respect to the receptacle.

6. The mounting pin means of claim 5, wherein the first electric switch contact comprises a metallic spring having a U-shape and including the contact projection thereon, and the contact projection being the part of the first electric switch contact which engages and makes contact with the second electric switch contact.

7. The mounting pin means of claim 6, wherein the first electric switch contact is a metallic stamping and the contact projection is made of a second material.

8. The mounting pin means of claim 6, wherein the contact projection is integral with and of the same material as the U-shaped metallic spring.

9. The mounting pin means of claim 1, wherein the mounting pin is bent at an angle along its length, for defining two arms thereof; the hollow of the mounting pin extending through both arms of the mounting pin and meeting at the bend.

10. The mounting pin means of claim 1, wherein the first electric switch contact comprises a metallic spring having a U-shape and including a contact element in the region of the free end of an arm of the "U", and the contact element being the part of the first electric switch contact which engages and makes contact with the second electric switch contact.

11. The mounting pin means of claim 10, wherein the first electric switch contact is a metallic stamping and the contact element is made of a second material.

12. The mounting pin means of either of claims 1 or 5, wherein the first switch contact has clamp shaped gripping arms, which are clampable toward each other, and which receive clamped therebetween a contact end of the electric conductor.

13. The mounting pin means of claim 1, wherein the first electric switch contact is formed from a length of bent wire and the length of bent wire has a generally hairpin shape, being bent at a sharp loop to define at least two arms thereof for providing resiliency thereof.

14. The mounting pin means of claim 13, further comprising a contact projection developed on and as a single piece with the first electric switch contact and the contact projection being the part of the first electric switch contact which engages and makes contact with the second electric switch contact.

15. The mounting pin means of claim 13, further comprising a contact projection developed on and being a separate piece from the first electric switch contact and the contact projection being the part of the first electric switch contact which engages and makes contact with the second electric switch contact.

16. The mounting pins means of claim 13, wherein the first electric switch contact part has a receiver for one end of the electric conductor, and the receiver is comprised of a material that is different from the material of the first electric switch contact.

17. The mounting pin means of claim 13, wherein the first electric switch contact includes a loop defined in the length of wire for receiving the electric conductor.

18. The mounting pin means of claim 17, wherein the loop is part of the first electric switch contact and is comprised of the same material thereof.

19. Mounting pin means for a sun visor for an automotive vehicle, wherein the sun visor includes an electrified light source in the body of the sun visor; the sun visor having swivel bearing means;

the swivel bearing means including a mounting pin connected to the body of the sun visor and around which the visor body is swivelable for defining the swivel bearing means there; the mounting pin being for connecting the sun visor body to the body of an automotive vehicle; the mounting pin being hollow and being comprised of electrically non-conductive material;

the mounting pin being bent at an angle along its length for defining two arms thereof; the hollow of the mounting pin extending through both arms of the mounting pin and meeting at the bend;

the swivel bearing means further including an electric conductor guided through the hollow of the mounting pin; the mounting pin being open at the bend and the opening at the bend communicates into the hollow in both arms of the mounting pin for enabling insertion of the conductor into the hollow arms through the opening at the bend;

the mounting pin including an end portion thereof at the sun visor body; an electric switch contact receptacle being defined in the mounting pin end portion;

a first electric switch contact being supported in the receptacle and being electrically connected with the conductor; the receptacle and the first switch contact are respectively so shaped that the first switch contact is prevented from swiveling in and with respect to the receptacle;

a second electric switch contact being supported on the visor body at the swivel bearing means; the second electric switch contact being electrically connected with the light source; and the first and second electric switch contacts being so shaped and positioned that at one swivel position of the visor body, the contacts engage, and at another swivel position of the visor body, the contacts disengage.

20. The mounting pin means of either of claims 9 or 19, wherein inside the mounting pin, where the hollows in the arms meet, a free space is developed which is larger in cross-section than the hollows in each arm.

* * * * *